(12) United States Patent
Salter et al.

(10) Patent No.: US 7,838,168 B2
(45) Date of Patent: Nov. 23, 2010

(54) FUNCTIONALLY INTEGRATED HYDROGEN FUEL CELL

(76) Inventors: L. Carlton Salter, 15850 Whitewater Canyon Rd., Canyon Country, CA (US) 91387; Robert Pendergrass, 22742 Norton Dr., Santa Clarita, CA (US) 91350; Jason Redmond, 213 N. Almon St., Moscow, ID (US) 83843

( * ) Notice: Subject to any disclaimer, the term of this patent is extended or adjusted under 35 U.S.C. 154(b) by 936 days.

(21) Appl. No.: 11/680,480

(22) Filed: Feb. 28, 2007

(65) Prior Publication Data

US 2008/0050632 A1 Feb. 28, 2008

Related U.S. Application Data

(60) Provisional application No. 60/823,486, filed on Aug. 24, 2006.

(51) Int. Cl.
- *H01M 6/36* (2006.01)
- *H01M 2/00* (2006.01)
- *H01M 10/00* (2006.01)
- *H01M 8/00* (2006.01)

(52) U.S. Cl. .................. 429/512; 429/452; 429/456; 429/457

(58) Field of Classification Search .................. 429/12, 429/19, 24, 26, 30, 32, 34, 35, 38, 39
See application file for complete search history.

(56) References Cited

U.S. PATENT DOCUMENTS

| | | | |
|---|---|---|---|
| 4,826,741 A | 5/1989 | Aldhart et al. | |
| 5,208,115 A | 5/1993 | Akagi | |
| 5,260,143 A | 11/1993 | Voss et al. | |
| 5,541,015 A | 7/1996 | Tajima et al. | |
| 5,798,187 A | 8/1998 | Wilson et al. | |
| 5,981,098 A * | 11/1999 | Vitale | 429/34 |
| 6,057,053 A * | 5/2000 | Gibb | 429/465 |
| 6,379,827 B1 | 4/2002 | Cipollini | |
| 6,555,262 B1 * | 4/2003 | Kaiser et al. | 429/34 |
| 6,682,839 B2 | 1/2004 | Wilkinson et al. | |
| 6,740,438 B1 | 5/2004 | Thom | |
| 6,808,834 B2 | 10/2004 | Koschany | |
| 6,880,628 B2 | 4/2005 | Yoshida et al. | |
| 6,916,564 B2 | 7/2005 | Clawson et al. | |
| 6,960,403 B2 | 11/2005 | Morse et al. | |
| 7,011,904 B2 | 3/2006 | Bunker | |
| 2002/0071978 A1 | 6/2002 | Bekkedahl et al. | |

(Continued)

*Primary Examiner*—Jennifer K Michener
*Assistant Examiner*—Eli S Mekhlin
(74) *Attorney, Agent, or Firm*—McAndrews, Held & Malloy, Ltd.

(57) ABSTRACT

A proton exchange membrane fuel cell has a unit cell assembly including an anode side and a cathode side. The anode side has a cooling base plate, a conductor assembly, a hydrogen flow field, a water absorbing element, and a hydrogen duct assembly. The cathode side has an air flow field, a conductor assembly, an air flow distributor, and an insulating compression plate with wing extensions. A membrane electrode assembly is disposed between the anode side and the cathode side physically connecting the flow fields on both the anode and cathode sides. A sealed anode assembly creates a sealed hydrogen volume and includes the anode conductor assembly, the hydrogen duct assembly, and the membrane electrode assembly all disposed between the insulating compression plate and the cooling base plate. The fuel cell may comprise multiple unit cell assemblies arranged in planar, folded, stacked, or pancake configurations.

34 Claims, 6 Drawing Sheets

U.S. PATENT DOCUMENTS

2003/0198853 A1* 10/2003 Choi et al. .................... 429/32
2004/0048141 A1    3/2004 Blank et al.
2004/0096725 A1*  5/2004 Mao et al. .................... 429/38
2004/0160019 A1*  8/2004 Williams et al. ............ 277/628
2005/0130007 A1*  6/2005 Cisar et al. .................... 429/32

* cited by examiner

FUNCTIONALLY INTEGRATED HYDROGEN FUEL CELL

BACKGROUND OF THE INVENTION

Fuel cells (not fuel storage cells) use hydrogen gas to generate electricity. Several general types of fuel cells exist. The present invention is concerned with PEM (proton exchange membrane) fuel cells.

A PEM fuel cell is typically comprised of a unit cell, shown "blown apart" in FIG. 1. The components of a PEM fuel cell include the hydrogen side bipolar plate 10, two sealing gaskets 12, a hydrogen flow field 14, a membrane electrode assembly (MEA) 16, an air flow field 18, and an air side bipolar plate 20. FIG. 2 depicts this PEM fuel cell assembled. A number of these PEM fuel cells may be stacked together as shown in FIG. 3.

A key component of the PEM fuel cell is the membrane electrode assembly (MEA). Typically, MEAs consist of a PEM sheet coated on both sides with an "electrode assembly". This electrode assembly coating is primarily a platinum metal (catalyst) supported on activated carbon. The electrode assembly is bonded to the PEM material. In some designs, the electrode assembly may be applied to the air and hydrogen flow fields that lay on either side of the MEA.

The anode side of the fuel cell typically contains hydrogen gas. Fuel cells can use either pure hydrogen or a reformate gas stream of hydrogen gas and carbon dioxide that also contains other gases that are byproducts of incomplete reformation. The platinum in the MEA disassociates the hydrogen molecule into atomic hydrogen (protons), which then attach to a platinum atom. Some of these protons are in contact with the PEM material and move into the PEM material. A preferred PEM material manufactured by DuPont is called NAFION®, a perfluorosolfonic acid/PTFE copolymer.

Due to energetic differences, the proton moves through the PEM in hydronium ions ($H_3O+$) to the cathode or air side. The platinum on the cathode side of the MEA facilitates the combination of the proton with available oxygen, forming water. This electrochemical process needs the electron released when the hydrogen molecule is catalytically split. This electron moves from the catalytic site on the anode side through the hydrogen flow field (a conductive open mesh of carbon cloth or paper for example) to the anode side of the bipolar plate (typically solid carbon), to the cathode side of the bipolar plate, through the cathode flow field (similar to the anode flow field) to the cathode platinum, thus supplying the necessary electron. Note that throughout these discussions, the terms anode side and hydrogen side are used interchangeably and the terms cathode side, air side and oxygen side are used interchangeably. These PEM cells are stacked electrically in series as shown in FIG. 3, and the end cells are connected through an electrical load through which the electrons move to complete the circuit.

The hydrogen gas volume is sealed by the gaskets. The flow field and the hydrogen flow channels cut in the bipolar plate facilitate transport of the hydrogen gas to the MEA. The hydrogen must be pressurized to supply the gas to the MEA. Typically, this pressure is just a few pounds per square inch gauge. Some designs increase the pressure to several atmospheres, but the hydrogen is so fluid that such higher pressures do not add much net power. As mentioned above, some designs use reformate hydrogen from the conversion of fossil fuels to hydrogen, carbon dioxide, and trace gases from incomplete conversion to the primary gases.

The cathode side is constructed in the same way as the anode side with the cathode side being either air or pure oxygen. The latter is more efficient but the oxygen must be supplied and the materials compatibility is more difficult. Pressurization of the air to several atmospheres can boost the power output by 10 to 30%.

A bipolar plate connects the cathode of one cell to the anode of the adjacent cell with the consequence that the cells must be stacked one on the other to provide electrical continuity. This design approach forces an assembly approach called the fuel cell stack, which inhibits design flexibility and manufacturing cost.

The bipolar plates are typically constructed of carbon and can be molded or machined. Carbon has been the material of choice. Metal plates have been investigated for cost reduction. The operational concern with metal plates is that metallic ions will be carried into the PEM material and tie up polymer strings thereby reducing the hydrogen transport efficiency. The presence of standing water with significant voltages that would be found by using cells in series with common flow channels aggravates this potential problem. Metal plates appear to be used in several commercially available fuel cells.

Management of the humidification of the PEM material is critical to efficient cell operation. As mentioned above, proton transport is via hydronium ions. The presence of the latter increases with the amount of water content in the PEM material. The resistance of a cell to hydrogen transport is easily measured and can change a couple of orders of magnitude due to the hydration of the PEM material. Therefore, one of the key cell design elements is the hydration of the PEM material. Often designers add water to the air and hydrogen sides to help hydrate the PEM material. The proton transport of the hydronium ion moves water from the anode side to the cathode side of the MEA. Additionally, product water is formed on the cathode side in completing the electrical circuit. The presence of product water and hydrated cathode air can create a water vapor partial pressure to push water back to the anode side. If the cathode air is too dry, the product water will preferentially move into the air. Moisturizing the hydrogen gas aids in humidifying the PEM membrane.

Heat management is also of concern. Fuel cells are about 40 to 60% efficient. The residual heat is primarily generated by the cathode catalytic operation. About 25 to 30 percent of this waste heat is removed by evaporation of the product water. The remaining heat must be actively removed. Attempts to remove this heat by increasing the cathode airflow will reduce the humidity of the air stream and the PEM material will tend to dry out. Consequentially, only a small part of the heat can be optimally removed via a cathode air stream. Another approach is to over humidify the anode side and force excess water through the PEM material. This water then evaporates cooling the cell. Finally, higher temperature operation facilitates heat removal and increases the amount of water the PEM material can hold, but these higher temperatures tend to dry out the PEM material. Some designs put cooling plates between the bipolar plates to help remove the internal heat. Some design approaches put cooling plates between each cell and some do not. Also, liquid coolant channels can be put into the bipolar plates, and the heat is transferred to a separate coolant/environment heat exchanger.

Some of the problems of this typical design approach are:

The bipolar plates are expensive to make. Considerable efforts by others have been made to cast the carbon or to use metal bipolar plates. The latter have been plagued with contamination and that contamination is aggravated by the complex flow pattern through the bipolar plates, which naturally traps liquid water.

The airflow through the bipolar plates is tortuous and creates unnecessary pressure losses.

The airflow is from one side to another, consequentially creating a temperature gradient across the PEM material that results in less efficient operation.

The large reliefs in the plates to accommodate gas flow create an inefficient electrical, electrochemical geometry. The pressure on the pads compresses the flow field, which restricts gas penetration but enhances electrical contact. In the channels, the opposite is true, especially for the flow of electrons that make contact only laterally through the flow field. This gross inhomogeneity leads to lower efficiencies.

The thermal management concept of removing significant heat by forced convection from the cathode side is inefficient. The approach of removing heat from less than 100% of the cells is inefficient. The approach of cooling the plates with a coolant and transporting that coolant to a secondary heat exchanger is inefficient. The approach of using a heat conduction plate to remove the heat from the cells to the sides of the stack for cooling is inefficient, creates temperature gradients in the stack, and provides a relatively small cooling fin structure.

The non-uniformity of the bipolar plate pattern creates non-uniformity in the humidification of the PEM material.

The hydrogen side is often more pressurized than the air side. The pattern of the channels of the bipolar plates ensures that the PEM material is not 100% supported and excess hydrogen pressure can rupture the PEM material. Likewise, if the cell is operated after the hydrogen supply is turned off, a vacuum can be created on the hydrogen side and the PEM material can rupture.

The overall design approach results in piece part assemblies and ancillary equipment of some complexity to move the air through the cathode side, humidify the supply gases, and mange the humidification of the PEM material. This design approach is also thermally and electrically inefficient. Furthermore, the bulkiness of the design and the decoupling of humidification (injection of water for example) and cooling (remote heat exchanger) leads to a design that is slow to respond to electrical load and environmental changes.

The stack design with such massive carbon bipolar plates forms a large thermal mass that results in a large thermal time constant. Large thermal time constants extend startup time and reduce response to load change.

Accordingly, there is a need for a PEM fuel cell with improved efficiency, improved airflow, improved thermal management, and reduced cost. The present invention satisfies these needs and provides other related advantages.

SUMMARY OF THE INVENTION

The present invention is directed to a proton exchange membrane fuel cell and various geometries for combining multiple unit fuel cell assemblies. The proton exchange membrane fuel cell comprises a unit cell assembly having an anode side and a cathode side. The anode side of the assembly has a cooling base plate, a conductor assembly, a flow field, a water absorbing element, and a hydrogen duct assembly. The cathode side has a flow field, a conductor assembly, an air flow distributor, and an insulating compression plate having wing extensions. A membrane electrode assembly is disposed between the anode side and the cathode side. The membrane electrode assembly is physically connected to the flow fields on the anode and cathode sides. The conductor assembly electrically connects adjacent cells. This design approach removes the constraint that adjacent cells be physically in contact, i.e. stacked.

The anode side conductor assembly, hydrogen duct assembly, flow field, water absorbing element and membrane electrode assembly are disposed within a sealed anode assembly. The sealed anode assembly comprises the anode conductor assembly, hydrogen duct assembly, and membrane electrode assembly disposed between the insulating compression plate and the cooling base plate. The sealed anode assembly is sealed by pressure sensitive adhesive layers or heat welding, thereby creating a sealed hydrogen volume.

The hydrogen duct assembly on the anode side comprises adjacent sheets of insulating film spaced apart by strips of insulating film welded (using heat or adhesive) along the length of the hydrogen duct assembly to form a sealed channel with openings at each end of the assembly. The sheets of insulating film comprise a polyester film or plastic sheet, such as MYLAR®. In addition sheets of pressure sensitive adhesive are adhered to opposite sides of the hydrogen duct assembly. An aperture is created through the hydrogen duct assembly having the same dimensions as the anode flow field, thereby permitting passage of the flow field through the assembly.

Both the anode and cathode conductor assemblies each comprise upper and lower pressure sensitive adhesive sheets surrounding a conductor and upper and lower insulating film sheets. Each conductor assembly further comprises two windows cut into the upper insulating film and upper pressure sensitive adhesive to expose an anode conductor and a cathode conductor. The anode and cathode conductors are preferentially coated with a non-oxidizing metal or a conductive polymer. The anode conductor is channeled by an etching process. The cathode conductor is perforated with spaced apertures through the conductor, the lower pressure sensitive adhesive and the lower insulator.

The membrane electrode assembly comprises a proton exchange membrane lined with anode and cathode electrodes. The anode and cathode electrodes comprise a platinum catalyst supported on activated carbon.

The anode and cathode flow fields comprise carbon cloth or carbon paper coated with polytetrafluoroethylene, such as TEFLON®. The cathode side air flow distributor comprises a stainless steel screen. The cooling base plate has cooling fins to radiate heat away from the assembly. The fuel cell may comprise multiple unit cell assemblies arranged in planar, folded, stacked or pancake configurations.

Other features and advantages of the present invention will become apparent from the following more detailed description, taken in connection with the accompanying drawings which illustrate, by way of example, the principles of the present invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
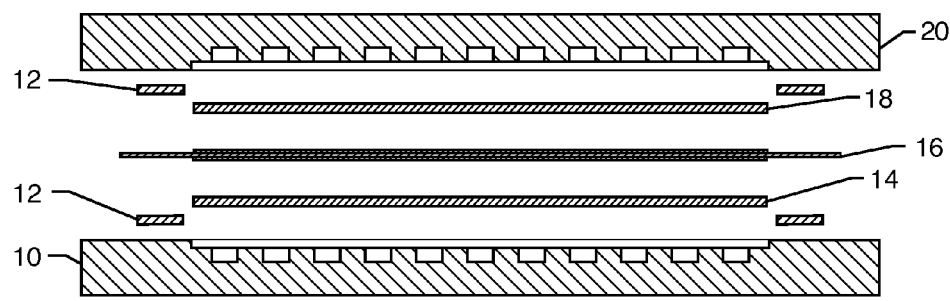
FIG. 1 is an exploded cross-sectional view of a prior art PEM fuel cell.
Figure 2:
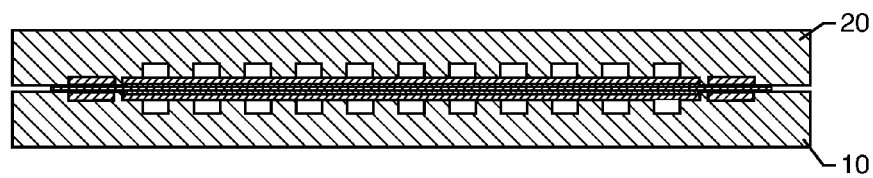
FIG. 2 is a cross-sectional view of an assembled prior art PEM fuel cell.
Figure 3:
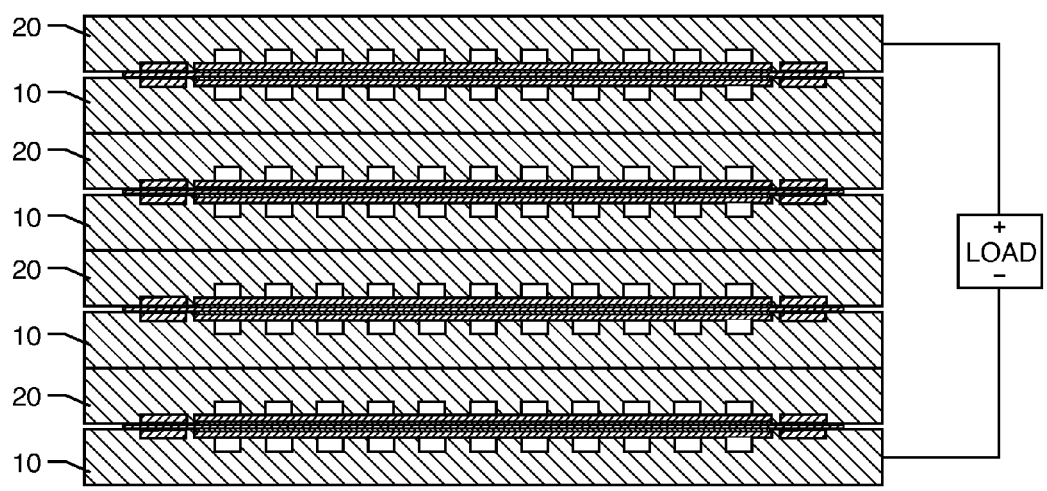
FIG. 3 is a cross-sectional view of an assembled array of prior art PEM fuel cells.

The present invention is directed to the assembly of a unit fuel cell in various geometries for assemblies of multiple unit fuel cells. As shown in FIGS. 4-11. Each unit cell assembly (UCA) 22 consists of an anode side heat-sink/cooling base plate 24, with the preferred use of cooling fins 26 shown, the anode side 30 of the conductor assembly 28, an anode flow field 32, a water absorbing element 34, the hydrogen duct assembly 36, a membrane electrode assembly (MEA) 38, a cathode flow field 40, the cathode side 42 of the conductor assembly 28, which is perforated with small holes to allow access of cathode air to the cathode flow field 40, a cathode air flow distributor (preferably stainless steel screen) 44, and an insulating compression plate 46 with wing extension 48.

The concept of the present invention is to form a PSA/heat sealed volume or anode assembly 50, containing the conductor assembly 28, hydrogen duct 36, anode flow field 32, water absorbing element 34, and MEA 38. The heat sink base plate 24 forms the rigid member for the UCA 22 and backs this anode assembly 50. Hydrogen is introduced into the anode assembly 50 through openings 52 at the end of the hydrogen duct 36. An identical opening is on the other end of the hydrogen duct 36. This configuration allows the flexible anode assembly 50 to expand and collapse with changes in hydrogen pressure.

Figure 4:
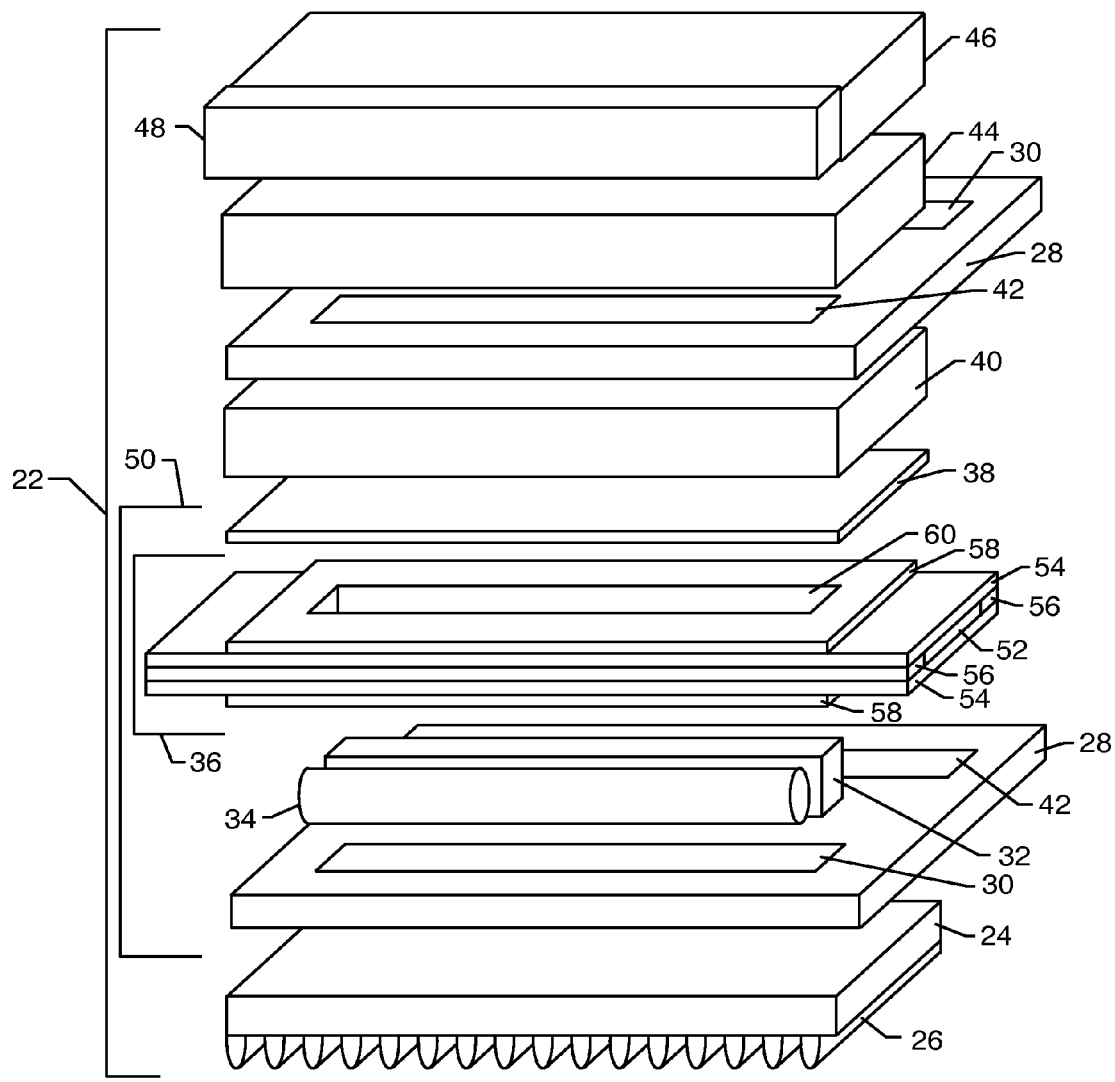
FIG. 4 is an exploded orthogonal view of a PEM unit cell assembly of the present invention.

The components of the hydrogen duct assembly 36 are shown in FIG. 4. Two thin (about 0.002") sheets of insulating film 54 are spaced apart with two spacer strips of insulating film 56 (about 0.002"). MYLAR® is the preferred choice of insulating sheet. There are many possible choices, including polyimide films such as KAPTON®. The purpose of the spacer strips is to insure a positive opening for hydrogen through the compressed and sealed ends of the cell. The duct could be built without these strips, but operation may be inhibited. The strips are bonded together (heat welded, adhered with glue, PSA, etc.) along the length to form a sealed tube with a through channel defined by openings 52. PSA strips 58 are adhered to the top and bottom sides. Rectangular holes 60 are cut out of the top and bottom layers to match the size of the active area of the MEA 38, which has the same area as the anode flow field 32. This assembly defines the hydrogen duct 36. The ends of the hydrogen duct 36 extend beyond the ends of the UCA 22 and are used to connect a hydrogen supply manifold into the through channel openings 52.

Multiple hydrogen ducts 36 can be fabricated as one unit with common hydrogen feeds included as part of the fabrication. This approach greatly simplifies the hydrogen manifold.

The outside of the hydrogen duct 36 can be also be constructed by using a tube of insulating film (not shown) or by heat welding a flat piece of insulating film to form a tube. The spacer strips 56 would then be located within the tube.

Figure 5:
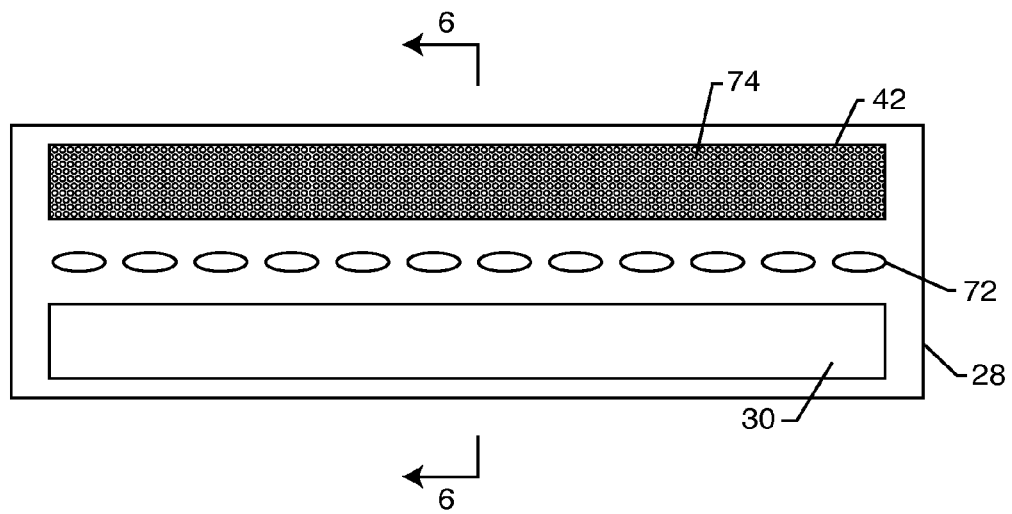
FIG. 5 is a top plan view of the conductor assembly of the present invention.
Figure 6:
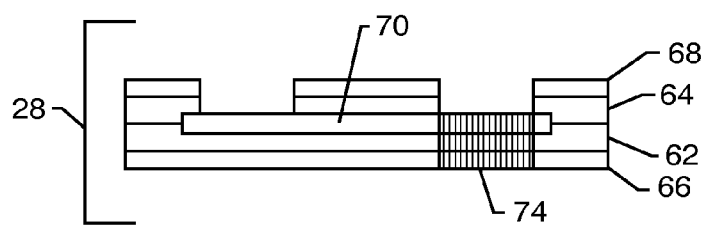
FIG. 6 is a cross-sectional view of the conductor assembly of FIG. 5 taken along line 6-6.

The conductor assembly 28 is detailed in FIGS. 5 and 6. This assembly electrically connects one cell to the next cell. This approach removes the design constraint imposed by the use of a bipolar plate, which requires the cells to be physically in series to be electrically in series. The assembly 28 is constructed using lower and upper pressure sensitive adhesive (PSA) elements 62, 64 about 0.002" thick, lower and upper insulating film sheets 66, 68 (typically 0.001" to 0.002"), and a conductive tape 70, preferably copper, about 0.002" thick. The PSA 62 is adhered to the insulating film tape 66. The conductor 70 is adhered to the PSA 62. A top layer of insulating film 68 and PSA 64 are adhered to the top of the conductor 70. The two PSA layers 62, 64 merge under pressure to seal the edges of the conductor 70.

The insulating-film/PSA top cover has windows cut into the film 68 and PSA 64 to expose the anode conductor 30 and cathode conductor 42. The exposed areas of the conductor 30 and 42 are gold plated to prevent oxidation and provide good electrical contact to the flow fields 32, 40. If necessary, the gold plating can be placed on the conductor 70 prior to creating the assembly 28. The gold could be replaced by a similar metal or conductive organic. The conductor material 70 is preferably metal, but could be carbon. Large air flow passages 72 are through cut in the assembly and will be discussed later.

The anode conductor 30 can be channeled to provide for hydrogen distribution. The channels are made as in a flex circuit by etching away the copper. The width of the etch lines can be a few thousands of an inch and must be narrow enough to maintain adequate compression of the flow fields. Hydrogen will flow readily down these small channels. The pattern of the channels can be complex as needed for hydrogen supply.

The cathode area 42 is perforated with small, geometrically spaced holes 74 through the conductor 70, PSA 62, and insulator 66. The hole size ranges from 0.003" to 0.030". The perforations 74 in the cathode conductor 42 can be formed by chemical etching, laser drilling, and dye stamping, to name a few methods. If the holes are made by chemical etching, matching holes can made in the insulating film 66 and PSA 62 by localized heating construction of the conductor assembly. Heat is applied by using a tool or with a heat lamp. This method is preferred because the chemical etching is the most cost effective and the secondary operation of using heat to melt and flow the MYLAR® is preferred because the edges of the holes will receive a protective coating.

The MEA 38 consists of a commercially available proton exchange membrane (PEM) coated with anode and cathode electrodes (platinum catalyst supported on activated carbon). MEAs 38 can be purchased and cut to fit with the seal being made against the catalyzed anode side or the MEA 38 can be purchased in a plastic frame, such as KAPTON®, and the seal is made to the plastic frame.

The anode assembly 50 is formed by compressing the conductor assembly 28, the hydrogen duct 36, and the MEA 38 together. The adhesive layers 58 form seals. Compression is created between the insulating compression plate 46 and the heat-sink/cooling base plate 24, which are held together using a clamping mechanism (not shown). This operation serves to seal the MEA 38, the hydrogen duct 36, and the anode conductor 28, and creates a sealed hydrogen volume 50. Adhesive layers 58 can be eliminated by heat welding the insulating films together where technically feasible.

The anode flow field 32 (conductive paper or cloth) is sandwiched between the MEA 38 and anode conductor 30. The flow field 32 provides a porous material through which the hydrogen flows and makes electrical connection between the MEA 38 and the anode conductor 30.

The anode side flow field 32 is wholly enclosed in the anode assembly 50. This flow field 32 requires compression to reduce its electrical resistively. The additive thicknesses of insulating films 54 56 68 and PSA 58 64 are chosen to provide a mechanical stop for the proper compression.

There are several commercially available flow fields 32, 40. The two main choices are carbon cloth or carbon paper. Both tend to hold moisture, which leads to flooding that blocks the catalytic operation. This problem is traditionally addressed by partially coating the flow fields 32, 40 with TEFLON® to render them hydrophobic. This coating can be put on one or both sides. The offered design should work better with both sides coated as there is no need in the design for a flow field 32, 40 to retain water.

Figure 11:
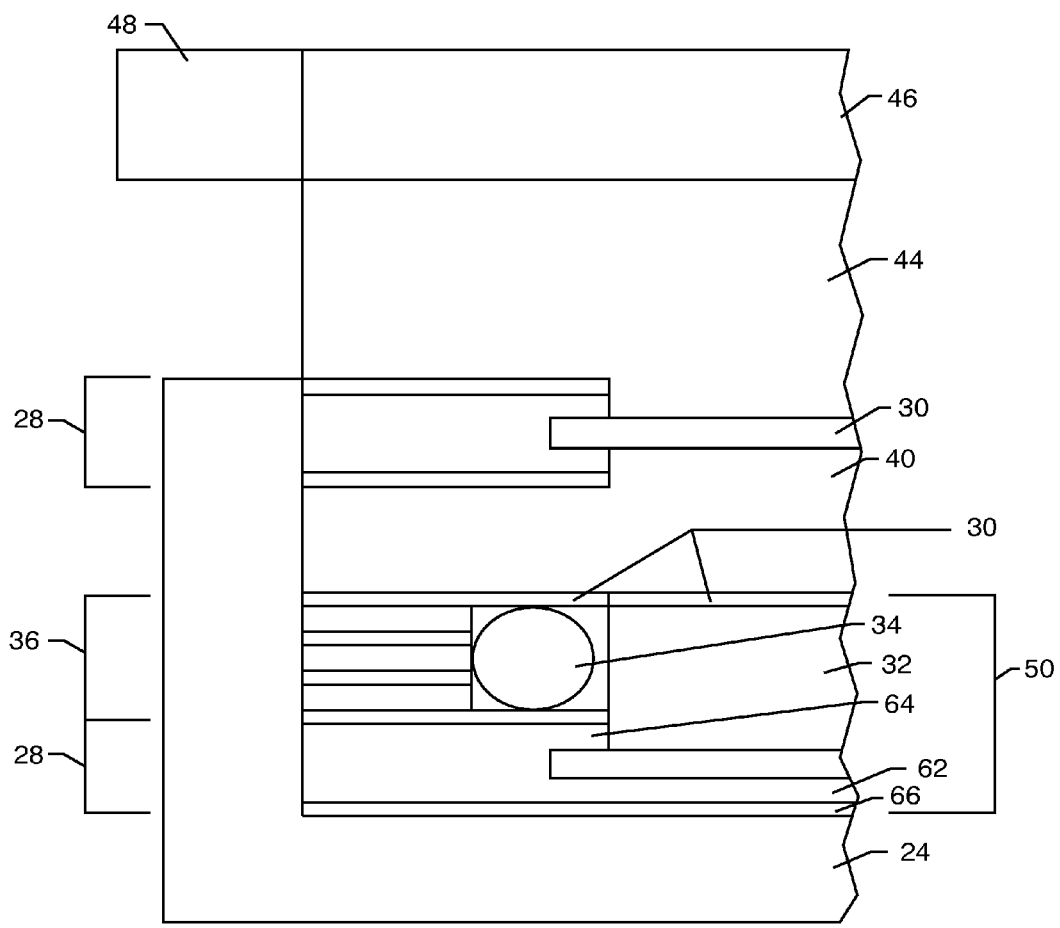
FIG. 11 is an end cross section view of a unit cell assembly including the water absorbing feature of the present invention.

The water absorbing element 34, shown in FIGS. 4 and 11, is placed near the edge of the anode flow field 32 in a preferred embodiment, and is contained within the anode assembly 50. The operation of the water absorbing element is discussed further below.

The cathode flow field 40 lies on top of the MEA 38. The cathode flow field 40 provides a path for flow of air or oxygen through the UCA 22. A combination of conductive carbon cloth or paper is the preferred method for constructing the cathode flow field 40.

The design of the UCA 22 protects the MEA 38 from damage resulting from pulling a vacuum (from hydrogen consumption) on the anode side as the anode assembly 50 is collapsible and the anode flow field 32, backed by the anode side heat sink base plate 24, uniformly supports the MEA 38. In contrast, the MEA for prior art bipolar plate designs cannot be supported very well due to the large dimensions of the hydrogen and air supply channels.

The cathode flow field 40 is laid onto the MEA side of the anode assembly 50, and the cathode conductor 42 and cathode air flow distributor 44 are laid on top.

The cathode conductor 42 of the conductor assembly 28 is the same construction as the anode conductor 30 except the conductor 70, PSA 62, and insulating film 66 are perforated with small holes 74 to allow flow of air into and product water vapor out of the cathode side of the MEA 38. These microporous holes 74 are the order of 0.003" to 0.030" in diameter on a rectangular or triangular pattern that provides up to 50 percent open area for air and product water vapor flow. The geometry and spacing of the perforations 74 can be varied to optimize the performance trade between electrical contact to the cathode flow field 40 and the in flow of cathode air and out flow of product water.

Those holes 74 can be formed by chemical etching, laser drilling, and dye stamping, to name a few methods. Additionally, the shape of the hole 74 is not limited to round, and they can be stamped to form louvers (semi round, linear, etc.) to aid in capturing the cathode air or releasing product water.

The geometry of the holes 74 in the cathode side 42 of the conductor assembly 28 and the cathode flow field 40 material and geometry maintain proper moisture and air availability to the MEA 30. For example, the geometry is set so that the distance from any point of the cathode catalytic surface, on the MEA 38, to the air window of the holes 74 in the cathode conductor 30 does not vary significantly. This geometry is easily achieved with a 10 mil compressed cathode flow field 40, which give a distance variation of ±12%.

The goal is to provide a very short diffusion path for the oxygen and water vapor, use appropriate flow fields (hydrophobic, hydrophilic, or a combination thereof), and maintain proper moisture for back diffusion of water vapor into the MEA 38 and its removal to cathode air by controlling the water vapor reservoir in the cathode air stream.

The cathode air flow distributor 44 sits on the cathode conductor 42. The flow distributor 44 provides a channel for the incoming cathode air to reach the micro-porous holes 74 in the cathode side conductor 42, mixing of the flow of this air, and support and transfer of the compressive force between the insulating compression plate 46 and the cathode side conductor 24C. A stainless steel screen is the preferred approach. Wire size is on the order of 0.0045" to 0.030". The mesh can be tight, about the wire size, or more open. The controlling requirements are the need to maintain uniform compression on the conductor assembly (small wire diameter and tight mesh) and the opposite requirement to reduce pressure drop of the cathode air flow. Multiple layers of screen could be used.

The insulating compression plate 46 rests on the cathode air flow distributor 44. The cooling fins 26 of the heat-sink/cooling base plate 24 of the adjacent UCA 22 rest on the compression plate 46. Compression is achieved by clamping heat-sink/cooling base plates 24 of adjacent UCAs 22 together. The purpose of the insulating compression plate 46 is to electrically insulate the cathode air flow distributor 44 from the cooling fins 26 of the adjacent heat-sink/cooling base plate 24 and to provide a uniform transfer of the compressive loads from these fins 26 to the cathode air flow distributor 44. Preferably, the insulating compression plate 46 is made of an extruded plastic.

A separate clamp part (not shown) holds adjacent heat-sink/cooling base plates 24, 46 together with a fixed spacing. This preset spacing provides a prescribed compression of the flow fields 32, 40. The electrical resistance of a flow field is a function of compression of the flow field. However, if the flow fields are compressed too much, flow of the supply gases and product water will be more restricted. Obviously, there is an optimum and the optimum is critical to a few thousands of an inch. This design approach offers a precisely controlled limit to the amount of compression.

A cost model has been developed to optimize the dimensions of the UCA 22. This model includes all major components and volume pricing of these components. Using this cost model, the overall external dimensions for a preferred embodiment of a UCA 22 are about 30 cm long×3.5 cm wide×1.0 cm high. The value for current density in this preferred embodiment using the chosen PEM material is about 0.75 A/cm$^2$ at an operation voltage of 0.6V. The cost optimized current density varies as a function of all cost parameters, including the polarization curve of the MEA 38.

Figure 7:
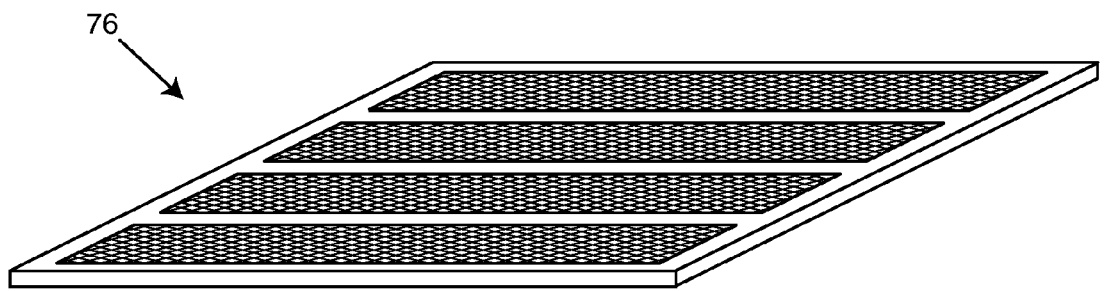
FIG. 7 is an orthogonal view of a flat geometry arrangement of four unit cell assemblies of the present invention.
Figure 8:
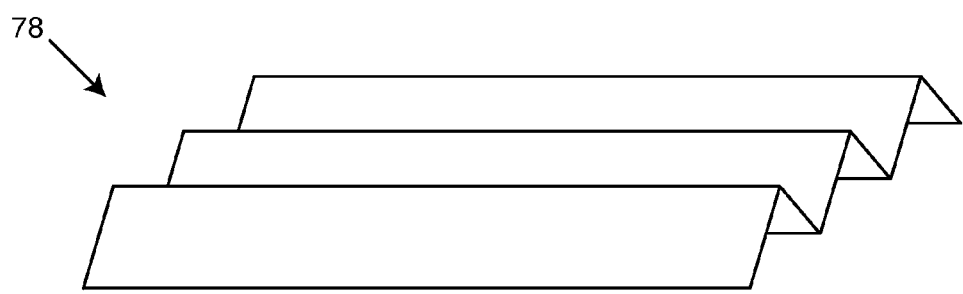
FIG. 8 is an orthogonal view of a folded geometry array of unit cell assemblies of the present invention.

The mechanical arrangements of multiple UCAs 22 are many. Only a few are mentioned herein. As shown in FIG. 7, the simplest form is a planar (flat) arrangement 76 of UCAs 22. An application for such a configuration could be use in a cell phone. The orientation of the plane may be either vertical or horizontal. Another arrangement, as shown in FIG. 8, could be a folded arrangement 78, similar to the flat assembly described above that has been folded along the intersection of UCAs 22. The overall form consists of peak and valleys. This arrangement adds height and shortens the width. Anode or cathode sides could be facing the same direction or may be alternated. The assembly may be oriented at any angle. The folds between UCAs 22 may be constructed to fit a variety of configurations as the overall set of folds may be curved to various shapes, i.e., square, u-shaped, circular or round. The angle of the fold may be up to 180°. Combinations of flat and folded geometries may be used. In these arrangements the cooling airflow (forced or natural convection) could be introduced either from the side or the end of the UCAs 22.

In these flat configurations, compression of the UCA 22 cannot be achieved by clamping adjacent UCAs 22. An alternate approach is to remove the cathode portion 42 of the conductor assembly 27 and substitute a micro porous stainless steel sheet (not shown). The holes in the stainless sheet perform the same function as the holes 74 in the conductor assembly 28. The stainless steel sheet is pre-bent around the long axis, and the long edges are pulled into the body of the UCA 22 with clamps. In this way, the stainless sheet acts as a flat spring compressing the flow fields. The thickness and width of the stainless steel is determined by cost trades. The edges of the stainless sheet contact the cathode conductor for electrical connection. The stainless sheet is also gold plated to provide a good, non-corrosive contact.

Figure 9:
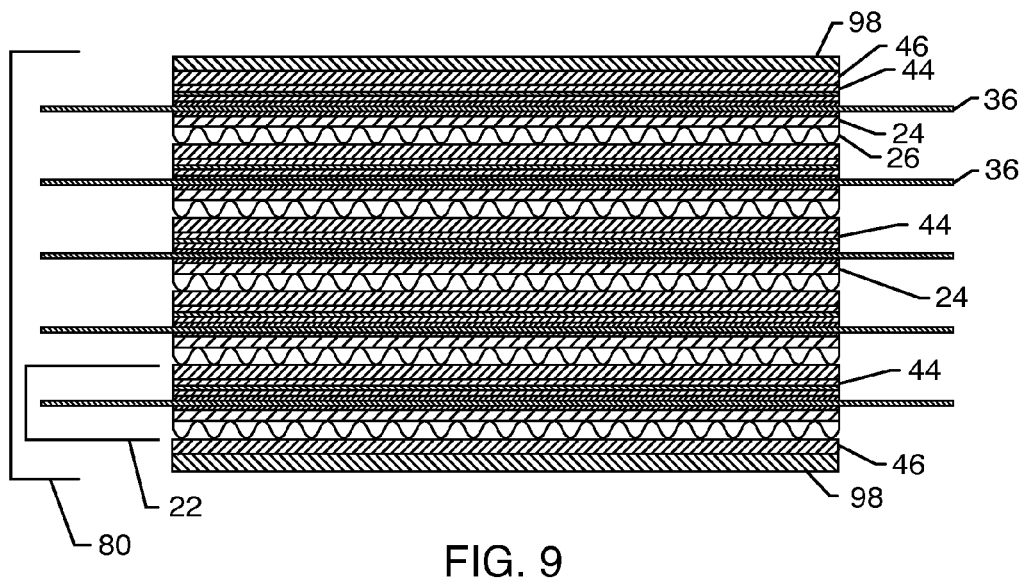
FIG. 9 is a stacked assembly employing five unit cell assemblies of the present invention.
Figure 10:
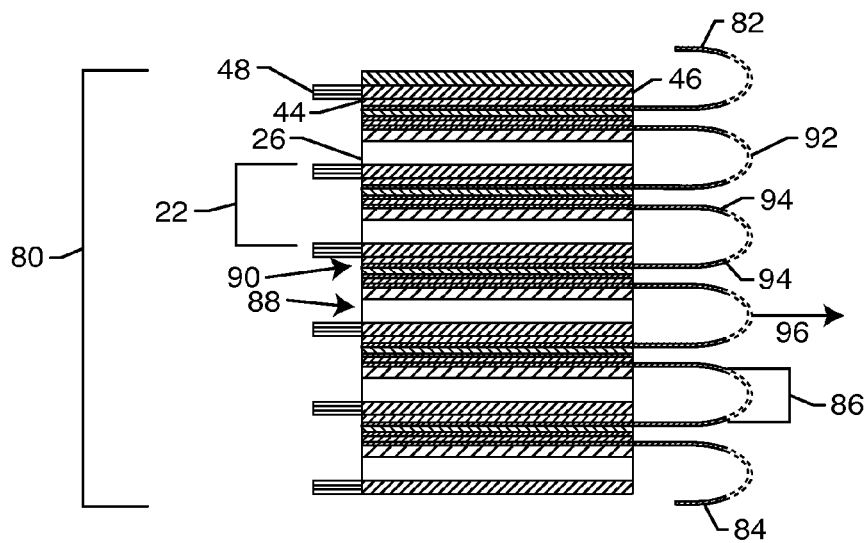
FIG. 10 is aside view of the five unit cell assembly of FIG. 9.

A stacked configuration of UCAs 22 is shown in FIGS. 9 and 10. Five UCAs 22 are depicted as a stack 80 to illustrate the electrically positive 82 and negative connection 84 to the stack 80 and to the inter UCA connection 86, represented by a dashed line. Multiple UCAs 22 are stacked to provide the desired voltage. Total current is determined by the length and width of each UCA 22 and the number of UCA stacks 80 in parallel. This stacked embodiment proves best for higher powered applications. For example, a stack of twenty-two UCAs 22 that are nominally 30 cm long, 3.5 cm deep and 1.0 cm high would form about a foot square pancake that is 1.4" thick with about 1 kWe output. Coolant (anode) air 88 and cathode air 90 flow from a common source normal to the stack 80. Air exit holes 92 are cut in the conductor assembly 94 because the wrapping of the conductor assembly 94 would otherwise block the exhaust air 96.

The direction of airflow 88, 90, 96 is across the depth of the UCA 22. Heat is removed from both the top and bottom surfaces (cathode and anode respectively). Hydrogen inlet and outlet (if necessary) are preferably from the ends 52 of the UCA 22. It is also possible to manifold the inlet and outlet from the sides. Electron flow from one UCA to the adjacent UCA is as follows. Electrons flow from the anode side of the MEA 38 of one UCA through the anode flow field 32 to the anode conductor 30 in the conductor assembly 28 which becomes the cathode conductor 42 of the adjacent UCA through the air flow distributor 44 through the cathode flow field 40 to the cathode side of the MEA 38 of the adjacent UCA. UCAs 22 are placed electrically in series and parallel configurations to give the desired voltage and current. The output of the UCA 22 described in this preferred embodiment is 30 We (watts electrical), which includes a 20% design margin, and the PEM temperature limit is set at 75° C. with ambient conditions of 45° C. These temperatures are used as an example and will vary with the temperature limits of materials used.

As will be discussed in more detail below, most of the waste heat from the UCA 22 is removed from the heat-sink/cooling base plate 24. The stainless screen (cathode air distributor) 44 aids in heating the inlet cathode air so that this air will provide the reservoir for product water management. The anode fins 26 are also part of the cost optimization program that includes the amount of material associated with the fins, the cooling effectiveness, and the stream power to push the coolant air through. In some applications, the fin height may be reduced to zero and then the above flat array, FIG. 7, may be the best approach for cost, irrespective of geometric requirements. Fins represent but one means of removing the heat. Other examples are pins, posts, or liquid coolant.

In one preferred embodiment of a 1 kW, rack mounted, pancake arrangement of UCAs 22, the division in airflow between anode and cathode sides is simply set by UCA 20 geometric considerations based on height of the anode fin 26 and the configuration of the cathode air flow distributor 44. In a simple design, the spacing would be fixed. More control can be added by adding a moveable flap 48 that is an extension of the insulating compression plate 46. This flap 48 extends into the inlet air stream and can be moved to progressively block either the anode fins 26 on an adjacent UCA 22 or the cathode air flow distributor 44. The flaps for the pancake can be ganged and controlled either actively or passively, for example with a bimetallic actuator that is referenced to ambient temperature.

The hydrogen duct 36 extends to openings 52 on the end of each UCA 22 and couples to the hydrogen inlet manifold, not shown.

The insulating compression plates 46 at the ends of the assembly are backed by metal stiffeners 98 (FIG. 9).

General operation design features are summarized as follows:

The operation functions of primary cooling and oxygen supply are separated to the anode and cathode sides, respectively.

The air and thermal management on the cathode side is for water management. The cathode side naturally benefits from evaporative cooling of about 25%-30% and will contribute some conductive cooling of about 5% as the cathode air must be heated by the cathode side to provide a maximum reservoir for the product water.

The remaining cooling is taken through the anode side. Heat is generated primarily at the cathode side catalyst and is removed to the anode side heat-sink/cooling base exchanger 24 through the MEA 38, hydrogen/anode flow field 32, anode current conductor 30, PSA 62, and insulating film 66. The thermal resistances of these materials can easily be kept sufficiently low due to the flat geometry and thinness of the materials to keep the temperature drop ($\Delta T$) across these materials to a few degrees centigrade. Most of the $\Delta T$ from the cathode side to the anode side is across the hydrogen and thermally parallel anode flow field 32. A key is to keep the anode flow field 32 very thin. Pressurization of the hydrogen helps lower the $\Delta T$. The insulating compression plate 46 also thermally insulates the adjacent UCAs 22.

Heat is finally removed to ambient through a heat exchanger, shown as fins 26, that is integral with the anode side heat sink base plate 24. Each UCA 22 is directly cooled by its own heat exchanger 26. Heat can be removed from the base plate 24 by forced or natural convection, conduction, liquid coolant, heat pipes, etc. However, the heat has to be transferred to the final heat sink, usually ambient air or water. Thus, the integral heat exchanger is the most efficient means for most applications as there are no intermediate heat transfers that would reduce the heat removal efficiency. In the presented embodiments, ambient air is taken to be the final heat sink. The final heat sink may also be water, earth, or an already in place large thermal mass such as a metal hydride hydrogen supply vessel. The airflow is along the Y direction (smallest dimension) of the UCA 22 to minimize pressure drop and temperature rise. This short dimension improves the performance of UCAs 22 by keeping the MEA 38 at a common temperature (aided by the heat exchanger base plate 24 which forms an isotherm).

The stacking of UCAs to achieve a design voltage is the preferred embodiment due to the more simple air manifolds, inherent flow field compression support, and significant increase in performance due to greatly enhanced water management capability. This arrangement provides a simple geometry for controlling the split and airflow between the cathode and anode sides.

The anode fin 26 height and density, the wire size and mesh density of the stainless steel screen 44, and the air flow length are chosen to control and balance air flow pressure drop, among other variables. Additional flow control is achieved by using the flap 48 on the insulating compression plate 46. A more complex manifold that isolates the cathode side for precise control of the cathode air or oxygen may be incorporated. Such a manifold is neither difficult nor expensive, and its value is simply a cost trade off of the benefits of increased performance against the cost of isolating cathode supply. With the cathode airflow isolated, the options of pressurizing the cathode air and/or using pure oxygen become available.

As discussed above, the choice of material for the insulating compression plate 46, wire size and mesh of the stainless steel screen 44, micro-holes in the cathode conductor 42, and flat anode conductor 30 backed by the heat-sink/cooling plate 22 creates a nearly uniform controlled mechanical pressure against the flat sides of the flow fields 32, 40. This pressure becomes even more uniform as it translates to the MEA 38 and almost eliminates any stress or strain on the MEA 38 due to local pressure differentials between the anode and cathode sides. Thus, the PEM material in the MEA 38 is very resistant to local rupture due to such pressure differentials, and this approach allows the use of much thinner PEM material. Thinner PEM materials have lower proton resistance and are easier to humidify. Furthermore, almost a complete vacuum can be drawn on the hydrogen side without rupturing the PEM material. This fact allows the use of thin, unsupported NAFION® or other PEM materials. Note that the cost model shows that NAFION® is the most expensive component. Using the micro support structure inherent with the described embodiments could offer a significant cost reduction.

The holes 74 in the thin cathode conductor 42 provide a short path between the MEA 38 and supplied oxygen. The compressed thickness of the cathode flow field 40, the size of the openings in the cathode conductor 42, and the spacing of these openings are all approximately the same dimension. Thus, oxygen and product water molecules have essentially equal opportunity for flow.

The compression of the flow field 40 by the cathode top screen 44 is relatively constant with little space to relax the compression under the holes.

The electric current path through the UCA 22 is balanced across the flow field 40 due to the micro structure of the conductor 42. This degree of balance is impossible with bipolar plates because of the inherent large pads and voids.

Providing a high aspect ratio of unit cell length to cooling air/oxygen supply length improves performance of a UCA 22. An embodiment with a length of about 30 cm and a width of 3 to 4 cm presents a high aspect ratio. A high aspect ratio minimizes coolant temperature rise helping to maintain uniform cell temperature. Such a ratio also minimizes coolant pressure drop. Other aspect ratios and/or airflow direction may be used to satisfy specific design constraints.

With this approach much greater control over cell temperature, oxygen feed, and MEA humidification is possible. The controlled parameters are MEA temperature and oxygen stoichiometry, which interact to control MEA humidification and oxygen supply. These interactions are discussed further below.

In a typical fuel cell, a cooling air stream and a cathode air stream come from a common source with this air stream both supplying oxygen to the cathode side and removing heat from both the cathode and anode sides in approximately equal amounts depending on the structure of the bipolar plate. For a stream temperature rise of 35° C. (75° C. exit less 40° C. inlet), assuming that 30% of waste heat is removed by evaporation, the air mass flow required to remove the remaining waste heat is >150 times stoichiometric. Such high air flows will dry out the MEA as the relative humidity of this cooling stream will be very low. Consequently, this stream must be pre-humidified, which adds mechanical and control complexity, or the flow must be reduced to 1.5 to 5 times stoichiometric. Now the heat cannot be removed by the cathode air and additional cooling is required. Methods include the following:

The basic approach is to just let the waste heat conduct to the sides and be convectively cooled at the edge surfaces of the bi-polar plates. A simple calculation shows that only a fraction of the heat can be removed this way. A recourse is to reduce the power density at the operating point to much less than optimum.

An inventive approach was used at Los Alamos National Labs (Wilson). This approach greatly humidifies the hydrogen, forcing excess water through the MEA, which evaporates on the cathode side to generate the required cooling.

Another approach uses conductive plates between the bipolar plates and extends these plates beyond the bipolar plates into the air to create cooling fins. The idea is to conduct the heat to the edge of the stack and then use forced air over the fins to remove the heat. This approach creates a temperature gradient along the cooling plate and presents a relatively small fin area for cooling. While it does reduce the airflow through the stack, the approach is an inefficient and indirect solution to the problem.

Other methods contemplate the use of intermediate cooling plates, alternating with the stacked bipolar plates that could be either air or water cooled. This approach is more effective than the previous methods as the temperature gradient can be kept lower, especially if the coolant is liquid. In this approach, the cathode air could then be tailored to only manage the product water. However, the understanding and teaching of this approach does not appear in the investigated literature. In addition, this approach uses a traditional stack arrangement with a long cooling length, and the heat captured by the intermediate cooling fluid requires a second heat exchanger to transfer the waste heat to a final heat sink. Additionally, a water circulation scheme must be implemented which adds complexity, and reduces reliability. This means, due to inefficiency of a second heat exchanger (the temperature drop through the fuel cell reduces the inlet temperature to the second heat exchanger), that the second heat exchanger is most likely larger than the offered UCA assembly (FIG. 9).

In the offered design approach, as depicted in FIGS. 9 and 10, the purpose of the cathode air is to provide oxygen and remove product water. The approach is to manage the temperature of the cathode air along the flow direction to create a prescribed water vapor reservoir profile. The design approach is to heat the cathode air as it passes through the UCA in a controlled manner so the water absorption capacity remains locally sufficient to exert a constant pull on the product water. In doing so, the humidification of the MEA can be controlled. For example, the cathode air at a position along the flow path will have absorbed a certain amount of water. For the air at this position to absorb more water, the relative humidity must be less than 100%. The relative humidity is controlled by the temperature of the cathode air. The amount of water vapor that can be absorbed at this position is the difference between the water vapor density at 100% relative humidity at the temperature at the position and the actual water vapor density. This difference is called the water vapor reservoir and is controlled by the temperature of the cathode air. The air is easier to heat as flow is reduced. Since the primary heat removal is through the anode side, the cathode air can run very close to the temperature of the MEA and substantially more product water can be removed. Adequate heat transfer must be designed into the cathode side to achieve these high temperatures. The design of the cathode air flow distributor 44 provides some flow mixing, which increases the heat transfer.

While the described embodiments do not include cooling fins on the cathode side, the intent is that the cathode side be treated as necessary to sufficiently heat the cathode air supply to remove the product water. There are many ways of enhancing the heat transfer. Some are as follows:

Extend the heat sink base plate 24 into the incoming cathode air stream and preheat the cathode air so the water vapor reservoir at the inlet side of the MEA is correct.

Adjust the mesh and wire size of the air flow distributor 44, even using several combinations, to vary the heat transfer from the cathode side to the cathode air along the flow direction. Note, while the cathode side does not support much cooling, there is sufficient temperature to control the temperature profile of the cathode air.

Replace the holes in the cathode conductor 24 with louvers, either linear or semi round. The shape and orientation of these louvers can be mixed to optimize performance.

Combinations of these approaches.

Calculations show that the flow can be just above stoichiometric (about 1.8 times stoichiometric) and is optimized for performance by the fuel cell controls discussed later. This flow will provide forced convection cooling of about 5%.

Additional cathode cooling, calculated to be about 25% to 30%, will be supplied by evaporation of the product water. The rest of the waste heat will be removed from the anode side, as discussed below.

The majority of the cooling is accomplished on the anode side. The keys to such anode side cooling are:

Heat conduction through the anode side to the anode side heat sink base plate 24. A very thin hydrogen flow field 28 (0.003" to 0.012") will keep the temperature drop across the hydrogen flow field 32 to a few degrees centigrade. Pressurization of the hydrogen reduces this $\Delta T$. In most fuel cells, the hydrogen pressure at its source is much higher than required by the fuel cell, and the pressure has to be deliberately dropped. Thus, increased pressure is essentially free and will be limited by hydrogen side pressure mechanical limits.

The anode side heat sink base plate 24 roughly matches the aspect ratio of the cell. This base can be either air or liquid cooled. The idea is to remove the heat from each UCA 22 to a final heat sink. The best design is to use air since eventually the heat must be dumped to air for most applications. Thus, the anode side becomes a simple finned heat exchange element with the heat of the fuel cell being removed directly by an air heat exchanger 26. Most of the heat is generated on the cathode catalyst, but is easily conducted to the anode side heat exchanger. The thermal resistance of the heat exchanger is greater than ten times the hydrogen flow field 32 (including the hydrogen) thermal resistance. The thermal resistance across the MEA 38 and anode current conductor assembly 30 is about one-fifth that of the hydrogen flow field. The heat exchanger thermal resistance is dominant.

Air flow is across the unit cell is used to manage the temperature of the MEA 38. The fin structure 26 of the base 24 is optimized (fin density, thickness, height, manufacturability, stream power, length) using the CDM. By assigning the primary air cooling function to the anode side, the air flow can be optimized against cost without compromising water management of the cathode side. For example, the anode airflow can be several hundred times the cathode flow under hot environmental conditions. Such high flows greatly enhance cooling and allow the MEA 38 to operate in hot ambient temperatures. At these high airflows, the short heat exchanger greatly reduces pressure drop. Also, the increased stream velocity results in a much larger heat transfer coefficient that also improves heat transfer. Such flexibility is not possible without this clear separation of cooling and water management functions and the use of the high aspect ratio.

The thickness of the anode side heat sink base plate 24 is designed to maintain constant MEA temperature via conduction. This feature is important for low power and cold temperature operation. For example, for operation at −20° C. ambient, the anode flow is reduced by a factor greater than 10, which allows the anode side heat-sink/cooling base plate 24 to operate at its optimal temperature (in the range of 60° C. to 70° C.). The temperature rise in the anode cooling stream is greater than 20° C. However, the temperature drop across the anode side heat sink base plate 24 is less than 1° C. and provides a very uniform temperature platform for the MEA 38. The cathode relative humidity can be easily maintained at the optimum point by small changes in stoichiometry (1.5 to 1.9) in the cathode airflow for ambient temperatures from −20° C. to 50° C.

The same control applies to varying power loads. Even at low power loads and cold ambient temperatures, the cell can be maintained hot with the MEA 38 and cathode air fully humidified.

The design approach provides for a very low thermal mass, especially when compared to the massive carbon bipolar plates and the attendant massive steel end plates. This low thermal mass shortens the cold start time and stabilization time for transient load change. A typical cold start methodology electrically shorts the cells, which operates the cells at a very inefficient portion of the polarization curve, i.e. high current and low developed voltage. Consequently, most of the power is developed in the MEA 38 and the cells self heat as fast as the thermal mass permits. The thermal time constant for the presented design can be more than a factor of one third that of traditional carbon stacks.

The key to fuel cell efficiency is management of the hydration of the PEM material. If the material is too dry, the resistance to proton movement through the PEM is high and the cell is inefficient. Consequently, the PEM material must be sufficiently hydrated, which must be done without significant formation of liquid water that will block the generation of electricity. It is advantageous to have a design that self hydrates. This approach eliminates system complexity and removes the requirement of adding make up water or of condensing the moist exhaust stream with the attendant collection and purification equipment. Water management is crucial. Operationally, water is brought to the cathode surface of the MEA 38 by osmotic drag, in which the proton that is transiting the PEM material in a hydronium ion drags this ion to the surface. Additionally, the proton combines with oxygen at catalytic sites on the cathode to form product water. These waters can go three places: into the cathode air stream, diffuse back into the PEM material, or collect as liquid. For proper operation, some of the water must go back into the PEM material to keep it hydrated. If the cathode air is too dry, then the water will tend to go into the air stream, drying the PEM material. If the relative humidity of the cathode air stream is too great, its pull on the water at the cathode is too weak and the water will either form a liquid or flow back into the PEM material. The driving force to pull the water back into the PEM material is the degree of humidification of the hydrogen water reservoir. If the relative humidity of the hydrogen is low, there is a strong pull on the cathode water. If the relative humidity is high, the pull is low. Thus, if the hydrogen and the cathode air are saturated with water, significant condensation will occur at the cathode and shut that portion of the cell off to power production. Since relative humidity is greatly temperature dependent, it is easier to understand the control issues if water vapor pressures are used. Since this design approach does not add water, the only water source to keep the PEM hydrated is the product water. At the same time, all of the product water must be removed or there will be liquid formation or flooding. Water holding capacity of gases is a very strong function of temperature, roughly doubling every 10° C. So, the first step is to operate the UCA 22 as hot as possible. The PEM material determines that limit and in the presented approach is taken to be about 77° C. Obviously, this temperature is material dependent. The anode air flow is used to control the PEM temperature. This control is easily accomplished since the cooling air is only on the anode side and is independent of the cathode air requirements. The next step is to supply sufficient cathode air to maintain enough oxygen as the oxygen is used as the air flows across the cell. The air flow must supply oxygen at the rate of 1.5 to 3 times the stoichiometric requirement. The term water vapor reservoir is used to describe the amount of water per cubic centimeter that the gas can still absorb, i.e. the difference in water vapor density between 100% relative humidity and the actual relative humidity. Water moves from the cathode based upon the water vapor reservoir of the cathode air stream and the hydrogen gas reservoir. The approach is to manage the driving forces of the hydrogen and cathode air to move the water vapor into the hydrogen water reservoir, thereby hydrating the PEM without flooding. This driving force is proportional to the amount of water vapor that the cathode air can still absorb, which is a function of the temperature of the cathode air and the amount of water vapor that has been absorbed. For the cathode side, if the cathode air is too moist, i.e. relative humidity is too great, then there is insufficient water vapor reservoir to pull the water off the cathode. If the relative humidity is too low, then the water leaves the cathode too readily and dries the cathode. For the anode side, water is pulled by osmotic drag to the cathode, and this action will dry the hydrogen reservoir. If there is adequate water at the cathode, i.e. the water has not been pulled into the cathode air; this water will be pulled back to the hydrogen water reservoir. The water vapor reservoir of the cathode air controls this balance. The water vapor reservoir can be microscopically controlled along the cathode air flow direction by controlling the cathode air mass flow and the temperature of this air. Temperature control is gained by controlling the heat transfer between the cathode and the cathode air as a function of distance along the flow direction. Analysis suggests that using a constant heat transfer may be adequate, and this approach requires a precise flow of cathode air of just less than two times stoichiometric. If greater performance is desired, the heat transfer along the flow direction must be varied. Designs that have discretely variable heat transfer coefficients are relative easy to implement. Two design approaches are to use screens of different mesh and/or wire size or to use an array of precisely spaced pins.

Given this approach, the presented design requires no external humidification of the anode or cathode gases, is self humidifying of the PEM, offers a precise control over the water vapor driving forces, and can maintain these design parameters across the entire active area of the cells and over a wide range of ambient conditions (temperature and humidity) and power loads.

Geometries similar to FIGS. 7 and 8 above are considered to be essentially passive geometries. Since there is no active control of the anode and cathode air flows, optimum performance probably will not be obtained. However, these geometries may be very cost effective as they lend themselves to the flat geometries possible in the offered design approach.

The balance between the anode and cathode air flow can be adjusted in several ways:

By the geometry of the heights of the entrances to each flow area and the relative pressure drops in the anode and cathode air passages. This approach allows the use of common inlet and exhaust manifolds. Since the flow of anode air may vary by factors of over 10 and the cathode air may vary by only a factor of two, optimum performance under all conditions will not be achieved.

The flow control flap 48 can be used to selectively block either the anode air inlet at the fins 26 or the cathode air inlet at the cathode air flow distributor 44. The combination of balancing flow inlet area, flow resistance, and the flap should provide sufficient control of the anode and cathode flows to meet all operational conditions including ambient temperatures of −20° C. to 50° C. and power levels from one percent of load to full load.

A further improvement is to isolate the cathode air volume and to provide this air independently. This approach allows the independent control of both air streams to achieve proper MEA temperature and cathode air relative humidity control as described above.

There is concern that the conductor assembly 28 could corrode or passivate the anode and cathode conductors 30, 42 creating unacceptable voltage drops or metal ions from the conductor which could poison the PEM material in the MEA 38. (Metal ions may attach to the PEM molecule and render the molecule ineffective.) Several manufacturers use metal bipolar plates. These plates are typically coated with a non-corrosive, electrically conductive material to prevent both problems. One such coating is gold. Other examples are chrome nitride (on stainless) and conductive polymers. Two microns of gold has been reported to be acceptable, but this amount of gold is too expensive. Another report showed that gold plated stainless bipolar plates performed as well as carbon plates over a 1000 hour test. The thickness of the gold was listed as "thin". The acceptable thickness based on cost is less than 0.2 microns. The literature does not specifically address this thickness of coating. This thickness is 20 times that required for a continuous layer and should prove acceptable. The literature also reported that micro cracks in the gold cause the underlying material to escape and reported that stainless preferentially leached nickel into the NAFION® over time. However, this nickel did not cause reduced performance over the tested period of 1000 hours. Gold is a very promising passivation for stainless, but there is no literature about gold on copper. Since the gold on copper has an underlying coating of nickel, the behavior of gold plated copper might be similar to stainless only worse as the nickel concentration is 100%.

As for the cathode side, gold plating is considered to be enough along with the residual water management mentioned below.

The edges of the anode and cathode metals will be sealed in the PSA 62, 64. The stainless wires in the air distributor are outside of the cathode conductor and are not a concern. However, the holes 74 in the cathode conductor 42 may be difficult to completely plate. The cathode conductor 42 has PSA 62 and insulating film 66 on the non-conductive side. As mentioned above, holes are made preferentially in the PSA 62 and insulating film 66 by heat. The process will be conducted in a fashion to force the melted PSA 62 and insulating film 66 to flow into the holes, sealing any exposed metal.

Metallic ion transfer can be viewed as a metallic plating phenomenon with metal ions moving from the anode conductor 30 to the adjacent cathode conductor 42 through a water medium. The PEM material in the MEA 38, via the hydration of the PEM material, can be considered a water medium. Consequently, metal ions will tend to move from the metallic anode conductor towards the cathode conductor, transiting the PEM. The offered design takes several steps to minimize poisoning of the PEM material from metal ions. The steps are presented below.

The effects of metallic ion contamination can be mitigated by managing residual water and voltage as follows:
   Minimize standing water during run time
   Eliminate standing water during off time
   Insure that any moisture is not exposed to more than one cell voltage
   Insure that cell voltages are low during off times The easiest path to prevent liquid formation is the air/cathode side especially since the movement is away from the MEA 38 and toward the cathode conductor 42. The open structure of the cathode construction supports direct control of humidity and of prevention of liquid water in places that might complete the plating circuit. For example, water vapor in the cathode side will condense on the coolest part. Analysis shows that the water density in the cathode flow field 40 can exceed 100% relative humidity and the water vapor will tend to condense. However, the cathode flow field 40 is strongly hydrophobic and water should not condense but will be drawn into the cathode air stream, which will be, by design, non-condensing, i.e. the temperature and volume of air is controlled to always have a relative humidity less than 100%

However, for prior art that uses metallic bipolar plates, the presence of standing water is hard to avoid on the cathode side without greatly increasing airflow. The construction of flow channels and contact pads on the macroscopic level (dimensions of 0.04 inches and greater) create places to inadvertently condense product water. Also, the significant temperature differences along any flow channel also encourage condensation of product water. Thus, the cathode side is likely to allow standing water to bridge the plating circuit from MEA 38 to the cathode conductor 42. Since the operational voltages polarize against metal ion migration toward the MEA 38 this can only happen when the cell is shut off and metal ions can migrate into the MEA 38.

In the proposed approach the anode side is the most likely place to experience metal ion migration. To humidify the MEA 38, significant water will move from cathode to anode, fully moisturizing the anode hydrogen. This anode area is to be kept thin for heat conduction and hydrophobic to discourage liquid water. The amount of water that can be held in the hydrogen is very small. However, the water will tend to condense on the colder portions of the hydrogen manifold, which presents a risk of a liquid water connection between the metallic anode conductor and the MEA. A water absorbing element 34, a very thin strip or cord of absorbing material, is placed in the hydrogen manifold 50 on the air inlet side of the anode flow field 32 to absorb excess water. This absorbing element 34 rests on the top insulating film cover 68 of the conductor assembly 28. So, there is no moisture to bridge from the anode conductor 30 to the MEA 38. Also, the absorbing material contacts the inactive (presumably KAPTON®) frame of the MEA 38 and does not contact the PEM material. This absorbing element 24 also moisturizes the hydrogen upon startup and is a source of moisture during sudden load increases. Such load changes will pull water vapor from the hydrogen gas to replace the hydronium ions used to transport the protons.

Other placements for absorbing element 24 are to stitch the hydrogen flow field 32 with hydrophilic threads (Mahlon) or to lay a net of hydrophilic treads between the anode flow field 32 and the anode current conductor 30.

In the typical cell design, there can be residual hydrogen in the cell, which would create a potential across the cell. The hydrogen cannot be evacuated via use, as this would put the anode side in vacuum and damage the PEM material. The hydrogen would have to be replaced with either air, which presents an explosion hazard, or an inert gas, which adds complexity. In the proposed design, at unit shutdown, a small load is placed across the fuel cell assembly and most of the remaining hydrogen can be used. A significant vacuum can be allowed on the anode side as the residual hydrogen is consumed, allowing the anode voltage to decrease. This approach manages both problems of hydrogen and its generated voltage.

In addition, the nature of the proposed design makes it easy to dry the anode and cathode flow fields 32, 40 and thereby eliminate any standing water. The cathode flow field 40 is open to the cooling air or environment and product water will be easy to evaporate after shutdown. The anode flow field 32 is confined and standing water that could complete a plating circuit can be prevented by a) purging the hydrogen side with the naturally dry hydrogen or nitrogen and/or b) absorbing the water into the above-mentioned hydrophilic material. The homogeneous design of the anode side avoids trapping areas for condensed water. A purged gas can be monitored for humidity to insure that liquid water is held only by the water absorbing element 34 or that the absorbing element 34 has been dried to a desired level.

The ability to allow a vacuum on the anode side and essentially evacuate the hydrogen in an off condition means that any cell voltage in this off condition will be very low and will greatly reduce any off-condition metal ion movement.

Most of the teaching and the technical description in this application uses a PEM material such as NAFION®. Two important characteristics of this class of PEM material are an operating temperature below the boiling point of water and the fact that the proton conduction of the material is strongly dependent upon the absorbed water content of the material. Water management of the PEM material becomes a significant factor in the design and operation of the fuel cell. Water management for the present design is through the control of humidification of cathode air and temperature of the PEM material, as discussed above. However, there is the possibility of industry developing a PEM material that operates above the boiling point of water, or is relatively independent of humidification, or both. The impact of such developments on the presented design is discussed below.

If the operating temperature is above the boiling point of water, but the proton conduction is still strongly dependent upon the water content of the PEM material, control of this water content will be essentially the same as for NAFION® type materials. The possibility of standing water will either go away or be greatly reduced. The water management and cell operation will be essentially as described. The major benefit of a higher operating temperature is that the size of the fuel cell will be reduced. For example, if the operating temperature of the PEM material increases from 75 C to 113 C (approximately the operating limit for automobile radiators), the size of the fuel cell will decrease by about 50%, for an ambient temperature of 52 C.

If the dependence of proton conduction on the water content of the PEM material is significantly reduced, independent of the maximum PEM operating temperature, the requirement for strict control of cathode air water vapor content will greatly relax and will reduce the complexity of the cathode air temperature management. However, some degree of water management will be necessary and the presented design features will still be applicable.

Although an embodiment has been described in detail for purposes of illustration, various modifications may be made without departing from the scope and spirit of the invention.

What is claimed is:

1. A proton exchange membrane fuel cell, comprising:
    at least two unit cell assemblies having an anode side and a cathode side;
    the anode side having a cooling base plate, a conductor assembly, a flow field, a water absorbing element, fins, and a hydrogen duct assembly;
    the cathode side having a flow field, a conductor assembly, an air flow distributor, and an insulating compression plate having controllably moveable wing extensions to block either the anode fins on an adjacent unit cell assembly or the cathode air flow distributor; and
    a membrane electrode assembly disposed between the anode side and the cathode side, the membrane electrode assembly physically connected to the flow fields on the anode side and the cathode sides.

2. The fuel cell of claim 1, wherein the anode side conductor assembly, hydrogen duct assembly, flow field, water absorbing element and membrane electrode assembly are disposed within a sealed anode assembly.

3. The fuel cell of claim 2, wherein the sealed anode assembly comprises the anode conductor assembly, hydrogen duct assembly, and membrane electrode assembly disposed between the insulating compression plate and the cooling base plate.

4. The fuel cell of claim 3, wherein the sealed anode assembly is sealed by pressure sensitive adhesive layers or heat welding to create a sealed hydrogen volume.

5. The fuel cell of claim 1, wherein the hydrogen duct assembly comprises adjacent sheets of insulating film spaced apart by strips of insulating film heat welded along the length of the hydrogen duct assembly to form a sealed channel with openings at each end of the assembly.

6. The fuel cell of claim 5, wherein the sheets of insulating film comprise polyester film.

7. The fuel cell of claim 5, further comprising sheets of pressure sensitive adhesive adhered to opposite sides of the hydrogen duct assembly, and an aperture through the hydrogen duct assembly.

8. The fuel cell of claim 1, wherein the conductor assemblies each comprise upper and lower pressure sensitive adhesive sheets surrounding a conductor, and upper and lower insulating film sheets.

9. The fuel cell of claim 8, wherein each conductor assembly further comprises two windows cut into the upper insulating film and the upper pressure sensitive adhesive to expose an anode conductor and a cathode conductor.

10. The fuel cell of claim 9, wherein the anode and cathode conductors are coated with a non-oxidizing metal or a conductive polymer.

11. The fuel cell of claim 9, wherein the anode conductor is channeled by an etching process.

12. The fuel cell of claim 9, wherein the cathode conductor is perforated with spaced apertures through the conductor, the lower pressure sensitive adhesive and the lower insulator.

13. The fuel cell of claim 1, wherein the membrane electrode assembly comprises a proton exchange membrane lined with anode and cathode electrodes.

14. The fuel cell of claim 13, wherein the anode and cathode electrodes comprise a platinum catalyst supported on activated carbon.

15. The fuel cell of claim 1, wherein the anode and cathode flow fields comprise carbon cloth or carbon paper coated with polytetrafluoroethylene.

16. The fuel cell of claim 1, wherein the cathode side air flow distributor comprises a stainless steel screen.

17. The fuel cell of claim 1, wherein the cooling base plate has cooling fins.

18. The fuel cell of claim 1, wherein the fuel cell comprises multiple unit cell assemblies arranged in planar, folded, stacked or pancake configurations.

19. The fuel cell of claim 1, wherein the controllably moveable wing extensions are controlled by an actuator.

20. The fuel cell of claim 19, wherein the actuator is a bimetallic actuator.

21. A proton exchange membrane fuel cell, comprising:
    at least two unit cell assemblies having an anode side and a cathode side;
    the anode side having a cooling base plate, a conductor assembly, a flow field, a water absorbing element, fins, and a hydrogen duct assembly, wherein the hydrogen duct assembly comprises adjacent sheets of insulating film spaced apart by strips of insulating film heat welded along the length of the hydrogen duct assembly to form a sealed channel with openings at each end of the assembly;
    the cathode side having a flow field, a conductor assembly, an air flow distributor, and an insulating compression plate having controllably moveable wing extensions to block either the anode fins on an adjacent unit cell assembly or the cathode air flow distributor;
    a membrane electrode assembly disposed between the anode side and the cathode side, the membrane electrode assembly physically connected to the flow fields on the anode and cathode sides; and
    a sealed anode assembly enclosing the anode side conductor assembly, the anode side hydrogen duct assembly, the anode flow field, the water absorbing element and the membrane electrode assembly.

22. The fuel cell of claim 21, further comprising sheets of pressure sensitive adhesive adhered to opposite sides of the hydrogen duct assembly, and an aperture through the hydrogen duct assembly; and wherein the sheets of insulating film comprise polyester film.

23. The fuel cell of claim 21, wherein each conductor assembly comprises upper and lower pressure sensitive adhesive sheets surrounding a conductor, upper and lower insulating film sheets, and two windows cut into the upper insulating film and the upper pressure sensitive adhesive to expose an anode conductor and a cathode conductor.

24. The fuel cell of claim 23, wherein the anode and cathode conductors are coated with a non-oxidizing metal or a conductive polymer; wherein the anode conductor is channeled by an etching process; and wherein the cathode conductor is perforated with space apertures through the conductor, the lower pressure sensitive adhesive and the lower insulator.

25. The fuel cell of claim 21, wherein the membrane electrode assembly comprises a proton exchange membrane lined with anode and cathode electrodes.

26. The fuel cell of claim 25, wherein the anode and cathode electrodes comprise a platinum catalyst supported on activated carbon.

27. The fuel cell of claim 21, wherein the sealed anode assembly comprises the anode conductor assembly, hydrogen duct assembly, and membrane electrode assembly disposed between the insulating compression plate and the cooling base plate.

28. The fuel cell of claim 27, wherein the sealed anode assembly is sealed by pressure sensitive adhesive layers or heat welding to create a sealed hydrogen volume.

29. The fuel cell of claim 21, wherein the anode and cathode flow fields comprise carbon cloth or carbon paper coated with polytetrafluoroethylene.

30. The fuel cell of claim 21, wherein the cathode side air flow distributor comprises a stainless steel screen.

31. The fuel cell of claim 21, wherein the cooling base plate has cooling fins.

32. The fuel cell of claim 21, wherein the fuel cell comprises multiple unit cell assemblies arranged in planar, folded, stacked or pancake configurations.

33. The fuel cell of claim 21, wherein the controllably moveable wing extensions are controlled by an actuator.

34. The fuel cell of claim 33, wherein the actuator is a bimetallic actuator.

* * * * *